(No Model.)　　　　　　　　　　　　　　　　2 Sheets—Sheet 1.
L. GOULD.
CIRCULAR SAWING MACHINE.

No. 287,275.　　　　　　　　　　Patented Oct. 23, 1883.

Attest:
F. H. Schott
[signature]

Inventor.
Lyman Gould
per J. C. Tasker atty.

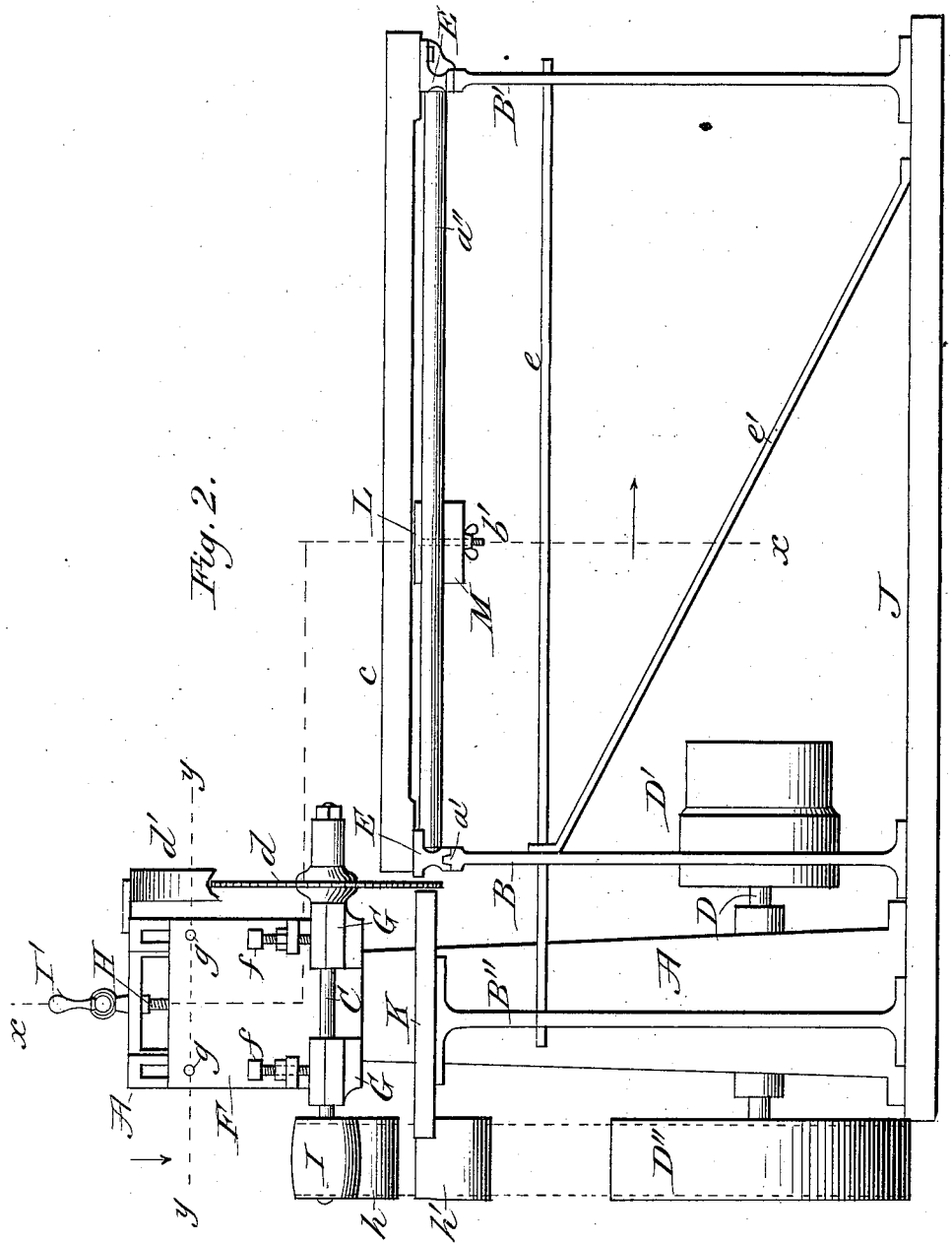

UNITED STATES PATENT OFFICE.

LYMAN GOULD, OF NORWICH, CONNECTICUT.

CIRCULAR SAWING MACHINE.

SPECIFICATION forming part of Letters Patent No. 287,275, dated October 23, 1883.

Application filed August 3, 1883. (No model.)

*To all whom it may concern:*

Be it known that I, LYMAN GOULD, a citizen of the United States, residing at Norwich, in the county of New London and State of Connecticut, have invented certain new and useful Improvements in Machines for Sawing and Gaining Lumber; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in machines for cutting off and gaining lumber; and it consists in the combination and arrangement of an adjustable saw or cutter-head, cutting over the top of the lumber, and a sliding carriage for supporting and feeding the work, as will be hereinafter described and claimed.

Figure 1:
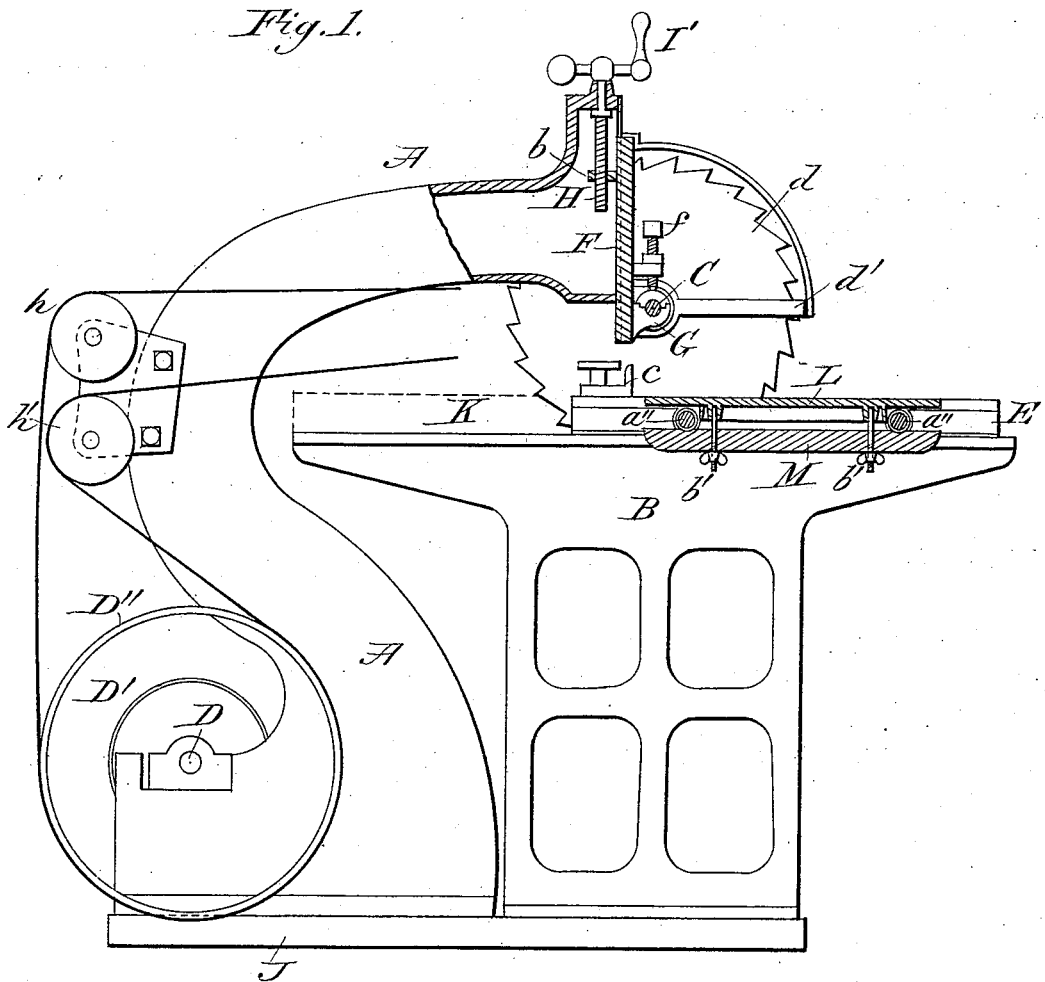
Figure 3:
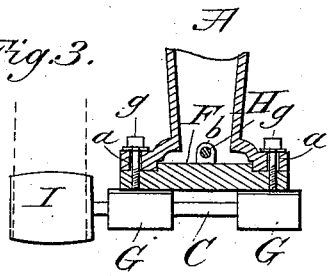

In the annexed drawings, which illustrate the invention, Figure 1 is a vertical section of my improved machine, taken on the line $x\ x$ of Fig. 2. Fig. 2 is an end elevation. Fig. 3 is a section on line $y\ y$, Fig. 2.

The letter A represents the frame on which the saw-arbor C is mounted.

J is the base of the machine, to which the frame A is bolted. This frame A is in the form of a curved arm, and overhangs the table K, as shown. Its lower portion is provided with journal-boxes in which the driving-shaft D rotates. The shaft D is driven by a belt, from any suitable motor, passing over the pulley D'. The arbor C is driven by a belt from a pulley, D'', on shaft D, passing over pulleys $h\ h'$ and pulley I on the arbor. The arbor C is journaled in bearings G G, secured to or cast on a slide, F. The slide F is adjustable on the frame A, working up and in grooves $a\ a$ on the front face of the frame A, the frame and slide being held in position and connected by means of bolts $g\ g$, Fig. 3. The slide F is vertically adjusted by means of the screw H and crank I' that are pivoted in the frame, A. The screw H works in a nut, $b$, on the back of the slide F, so that revolving the screw by means of the handle I' will raise or lower the slide, and with it the arbor C, as desired, to accommodate the size of saw being used or the depth of cut to be made. The caps on the arbor-journals are held in place by bolts $f\ f$.

B B' are side frames or stands, which are bolted to the base J. The frame B is provided on its top edge with a way or track, $a'$, on which the carriage E slides back and forth past the saw $d$ and guard $d'$. The frame B' has no track on its top edge, the carriage merely sliding on its planed surface. The frames B and B' are connected and braced by rods $e\ e'$. Transverse rods $a''\ a''$ extend across the carriage E, uniting the sides of the same.

L is the upper portion of an adjustable table or support, and M is the lower portion of the same, the two portions being clamped to the rods $a''\ a''$ by means of bolts and thumb-nuts $b'\ b'$, as shown in Fig. 1. This table is adjustable laterally on the rods $a''\ a''$, and serves as a support for the lumber while the same is being cut to lengths. A gage or stop, $c$, is attached to one end of the carriage E, and extends across the same, as shown in Fig. 2. This stop $c$ may have graduations marked on its face, and thus act as a gage when sawing lumber to given lengths. A stand, B'', bolted to the base J, has secured to it a stationary table, K, that is on a line with the top of the sliding carriage E, and serves the purpose of holding the lumber during the operation of cutting off the same.

The operation of the machine is as follows: When it is desired to use the machine for cutting-off purposes, the boards or lumber are laid across the carriage, resting on the supporting-table L, and held against the gage $c$. The carriage, with the board projecting the required amount to be cut off, is moved up to the saw by the operator, the saw cutting off the board as it passes by. By moving the carriage back again and setting the lumber the operation may be repeated. In case it is desired to gain or notch timbers, the same may be done by removing the saw from the arbor and securing in its stead a suitable cutter-head. By means of the slide F, the cutter can be adjusted to cut the required depth of gain. The timber resting on the carriage and table is fed to the cutter, which performs the required operation.

Having thus described my invention, what I claim as new, and desire to secure by Letters Patent, is—

1. In a machine for sawing or gaining lumber, the combination of the frame A, the adjustable slide F, supporting an arbor, C, carrying a saw or cutter-head, the frames B B' B'', stationary table K, sliding carriage E, having a gage, c, and transverse rods a'' a'', the adjustable sliding support L M, and thumb-nuts and screws b' b', substantially as shown and described.

2. In a machine for sawing or gaining lumber, the combination, with the sliding carriage E, having rods a'' a'', of an adjustable sliding support consisting of an upper portion, L, and a lower portion, M, adapted to be adjusted on said rods, to which they are clamped by thumb-screws and nuts b' b', substantially as described.

In testimony whereof I affix my signature in presence of two witnesses.

LYMAN GOULD.

Witnesses:
GEO. H. BRUCE,
GERARD L. PARKER.